United States Patent
Ogura

(10) Patent No.: US 7,766,564 B2
(45) Date of Patent: Aug. 3, 2010

(54) SHUTTER DEVICE OF A CAMERA HAVING TWO SHUTTER BLADES

(75) Inventor: Kazuhiko Ogura, Chiba (JP)

(73) Assignee: Union Plus Technology Co., Ltd., Jung-He, Taipei (TW)

( * ) Notice: Subject to any disclaimer, the term of this patent is extended or adjusted under 35 U.S.C. 154(b) by 173 days.

(21) Appl. No.: 12/187,531

(22) Filed: Aug. 7, 2008

(65) Prior Publication Data
US 2009/0310958 A1    Dec. 17, 2009

(30) Foreign Application Priority Data
Jun. 11, 2008   (TW) ............................... 97210352 U

(51) Int. Cl.
*G03B 9/14*   (2006.01)
*G03B 9/10*   (2006.01)
(52) U.S. Cl. ................. 396/493; 396/463; 396/490; 396/502; 359/233
(58) Field of Classification Search ................ 396/463, 396/484, 490, 493; 359/233
See application file for complete search history.

(56) References Cited

U.S. PATENT DOCUMENTS

| | | | |
|---|---|---|---|
| 7,573,629 B2 * | 8/2009 | Bai | 359/230 |
| 2005/0025477 A1 * | 2/2005 | Watanabe et al. | 396/450 |
| 2005/0123290 A1 * | 6/2005 | Hasegawa et al. | 396/484 |
| 2006/0006968 A1 * | 1/2006 | Mizumaki | 335/272 |

* cited by examiner

*Primary Examiner*—Melissa J Koval
*Assistant Examiner*—Bret Adams
(74) *Attorney, Agent, or Firm*—Browdy and Neimark, PLLC

(57) ABSTRACT

A shutter device of a camera includes an upper plate and a bottom plate. An oscillator, which is provided between the upper plate and the lower plate, includes a rotator having a spindle, and the spindle pivots its opposite ends on pivot portions of the upper plate and the lower plate respectively. A driving arm is provided to the spindle to swing two shutter blades for exposing or shading an aperture of an aperture plate. One of the shutter blade is fixed to the driving arm that the spindle is no longer to be a rotation center of the second shutter blade, so that a working space, in which the aperture plate, the shutter blades are received, is elevated to the same level as the pivot portion of the lower plate to reduce a thickness of the shutter device.

4 Claims, 5 Drawing Sheets

SHUTTER DEVICE OF A CAMERA HAVING TWO SHUTTER BLADES

BACKGROUND OF THE INVENTION

1. Field of the Invention

The present invention relates generally to a camera, and more particularly to a shutter device of a camera.

2. Description of the Related Art

FIG. 4 and FIG. 5 show a conventional shutter device of a camera, which includes an upper plate 60 and a lower plate 62. An aperture plate 64, which has an aperture 66 for exposure, is provided under the lower plate 62. A first shutter blade 68 and a second shutter blade 70 are provided under the aperture plate 64 to be driven to shade the aperture 66 of the aperture plate 64. Between the upper plate 60 and the lower plate 62 is an oscillator 74 having a coil 76, a yoke 78, and a rotator 80. The rotator 80 has a spindle 82 having ends pivoted on pivot portions 601, 621 of the upper plate 60 and the lower plate 62. Two hold plates 84 are provided on the upper plate 60 and the lower plate 62 respectively. Between the lower hold plate 84 and the lower plate 62 is a working space 86, in which the aperture plate 64, the first and the second shutter blades 66, 68 are received. A driving arm 88 has an end fixed on the spindle 82 and a driving pin 90 on the other end. The driving pin 90 extends through the lower plate 62 and enters the working space 86. Besides, the spindle 82 has an axle portion 821 on the lower end thereof. The axle portion 821 extrudes out of the pivot portion 621 of the lower plate 62 and enters the working space 86. The first shutter blade 68 has an axle bore 681 and a driving bore 682, and the second shutter blade 70 has an axle bore 701 and a driving bore 702 too. The axle bore 681 of the first shutter blade 68 is fitted to an axle portion 92 on the lower plate 62, and the axle bore 701 of the second shutter blade 70 is fitted to the axle portion 821 of the spindle 82. The driving pin 90 of the driving arm 88 is inserted into both of the driving bores 682, 702 of the first and second shutter blades 68, 70 that when the oscillator 74 is working, the first and second shutter blades 68, 70 are driven by the driving pin 90 of the driving arm 88 to shade or expose the aperture 66 of the aperture 64.

In recent days, the cameras are made as thinner as possible that the conventional shutter device can't meet the requirement.

SUMMARY OF THE INVENTION

The primary objective of the present invention is to provide a thinner shutter device of a camera.

According to the objective of the present invention, a shutter device of a camera includes an upper plate and a bottom plate. An oscillator, which is provided between the upper plate and the lower plate, includes a rotator having a spindle, and the spindle pivots its opposite ends on pivot portions of the upper plate and the lower plate respectively. A driving arm is provided to the spindle to swing two shutter blades for exposing or shading an aperture of an aperture plate. One of the shutter blade is fixed to the driving arm that the spindle is no longer to be a rotation center of the second shutter blade, so that a working space, in which the aperture plate, the shutter blades are received, is elevated to the same level as the pivot portion of the lower plate to reduce a thickness of the shutter device.

DETAILED DESCRIPTION OF THE INVENTION

Figure 1:
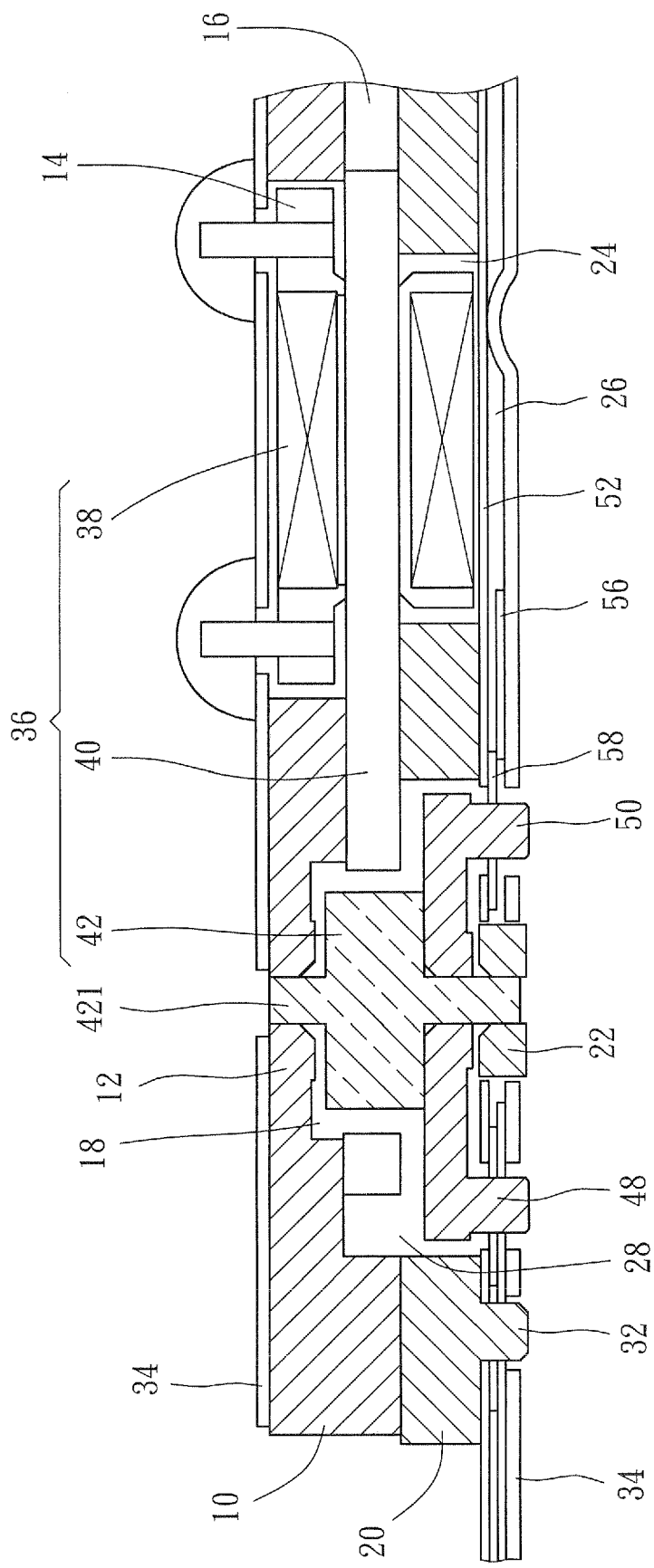
FIG. 1 is a sectional view of a preferred embodiment of the present invention.
Figure 2:
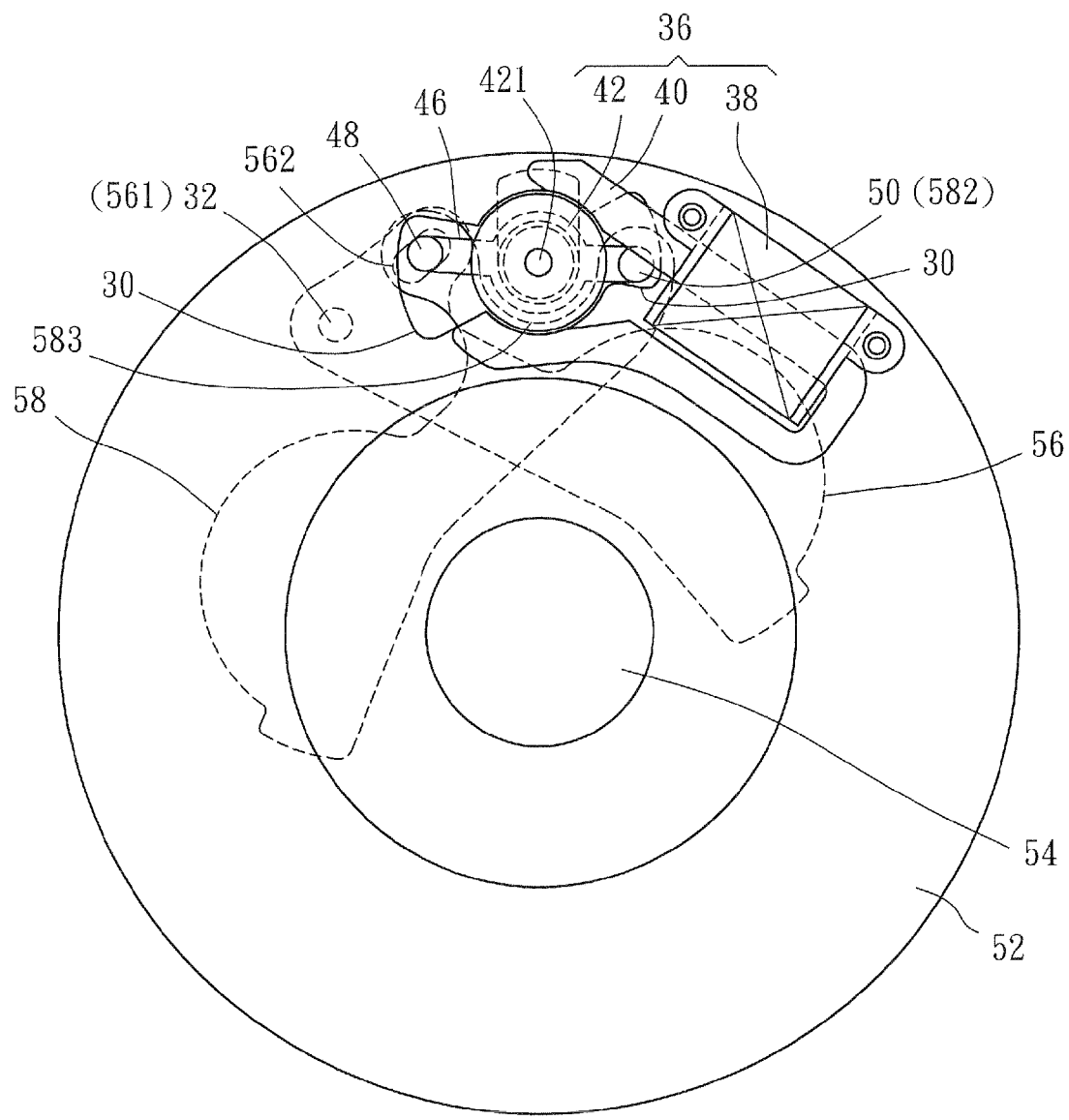
FIG. 2 is a top view of the preferred embodiment of the present invention, showing the shutter blades exposing the aperture of the aperture plate.

As shown in FIG. 1 and FIG. 2, a shutter device of a camera of the preferred embodiment of the present invention includes:

An upper plate 10 has a pivot portion 12 and a hole 14. The upper plate 10 has a cavity portion 16 on a bottom side thereof and a slot 18 on a bottom of the cavity portion 16.

A lower plate 20 has a pivot portion 22, a hole 24, and two guiding slots 30 beside the pivot portion 22. The lower plate 20 also has a cavity portion 26, on a bottom of which the pivot portion 22 and an axle portion 32 are projected. On an upper side of the lower plate 20 has a slot 28 above the pivot portion 22 and associated with the slot 18.

The lower plate 20 is laminated on the upper plate 10, and two hold plates 34 are laminated on a top side of the upper plate 10 and the bottom side of the lower plate 20. In this condition, the cavity portion 26 on the bottom side of the lower plate 20 becomes a working space, and the slots 18, 28 of the upper and lower plates 10, 20 become a rotator room.

An oscillator 36 has a coil 38 received in the hole 14, 24 of the upper and lower plates 10, 20, a yoke 40 received in the cavity portion 16 between the upper and lower plates 10, 20 and extended from the coil 38 to the rotator room 18, 28, and a rotator 42 received in the rotator room 18, 28. The rotator 42 has a spindle 421 having opposite ends pivoted on the pivot portions 12, 22 of the upper and lower plates 10, 20 respectively. The oscillator 36 is a conventional device which may oscillate the spindle 421 in a predetermined angle.

A driving arm 44 has a bore 46 at a middle to be fitted to the spindle 421. A first driving pin 48 and a second driving pin 50 are provided on a bottom of opposite ends of the driving arm 44. The first and second driving pins 48, 50 extend through the guiding slots 30 of the lower plate 20 and enter the working space 26.

Figure 3:
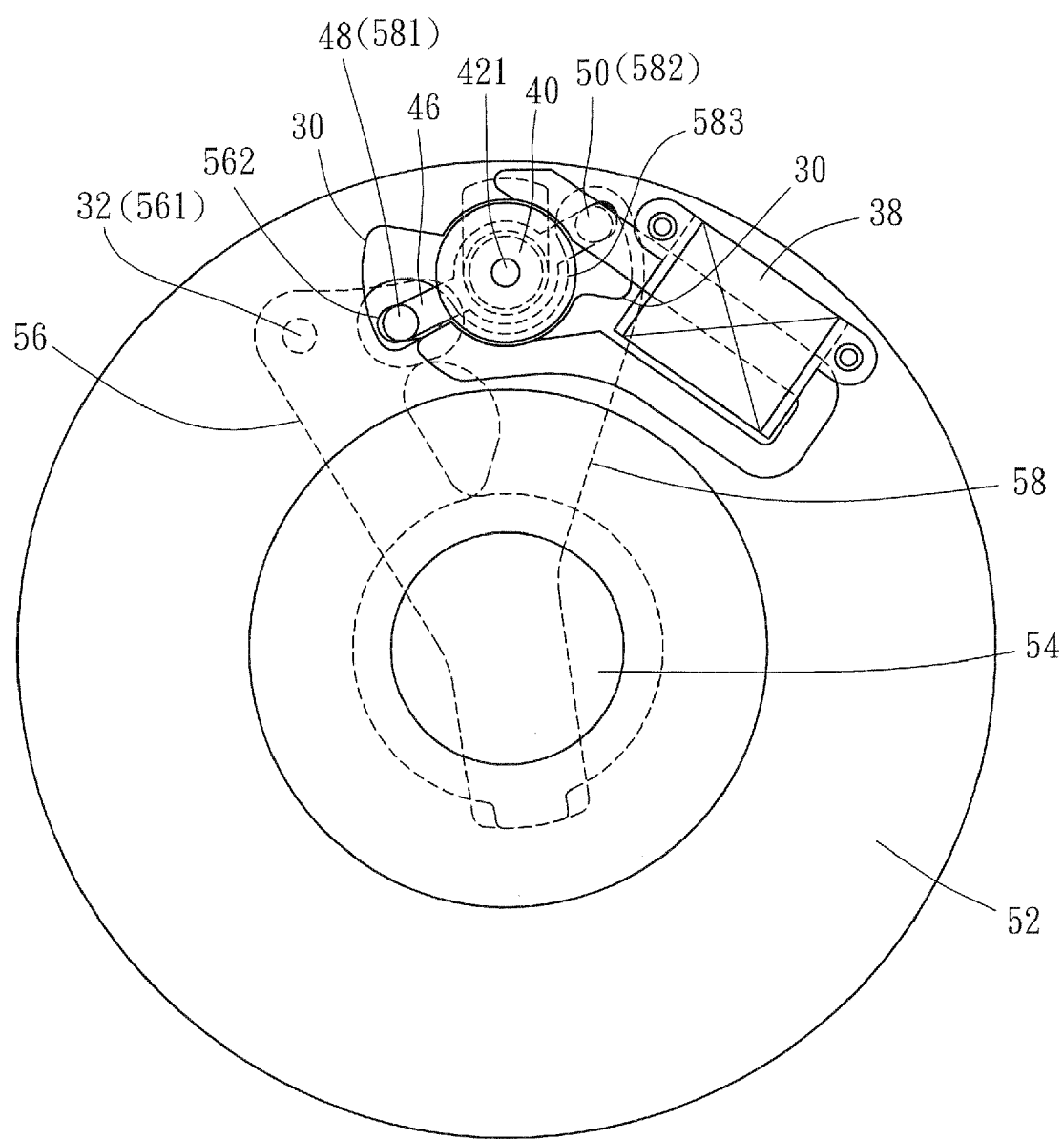
FIG. 3 is a top view of the preferred embodiment of the present invention, showing the shutter blades shading the aperture of the aperture plate.
Figure 4:
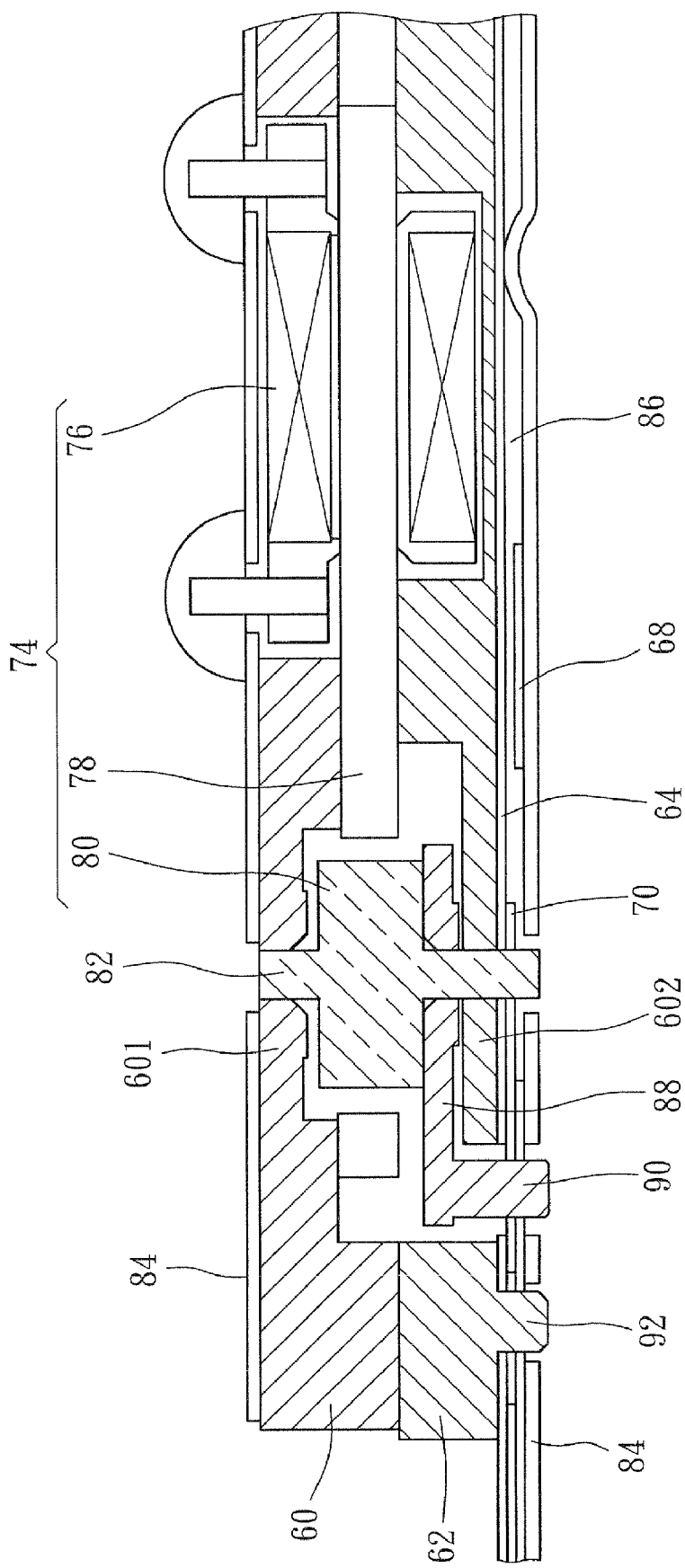
FIG. 4 is a sectional view of the conventional shutter device of the camera.
Figure 5:
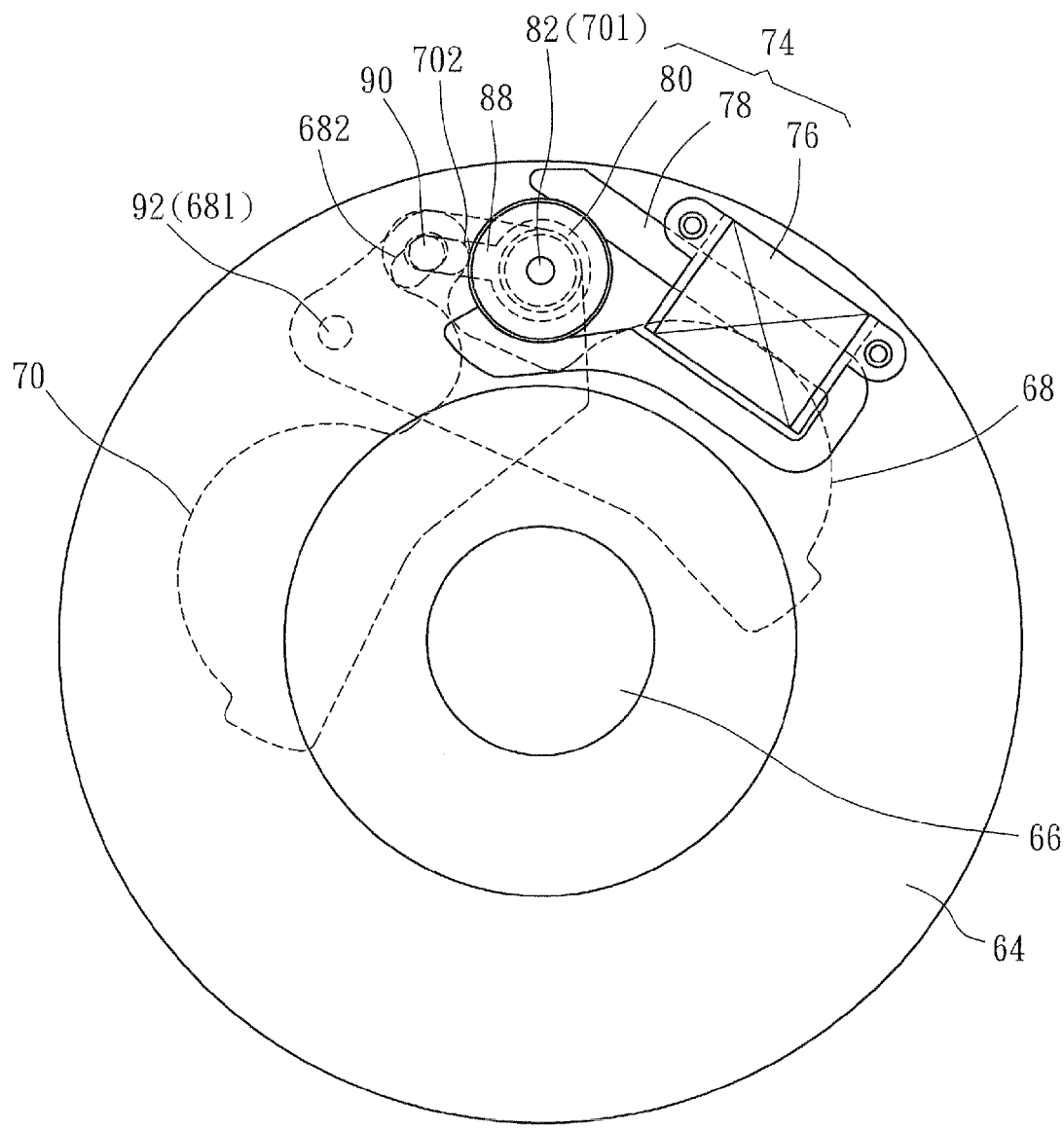
FIG. 5 is a top view of the conventional shutter device of the camera.

In the working space 26, an aperture plate 52, a first shutter blade 56 and a second shutter blade 58 are provided. The aperture plate 52 has an aperture 54 at a center thereof for exposure. The first shutter blade 56 has a first bore 561 fitted to the axle portion 32 of the lower plate 20 and a second bore 562 fitted to the first driving pin 48 of the driving arm 44. The first shutter blade 56 is like the conventional shutter plate having the axle portion 32 to be a center of rotation and driven by the first driving pin 48 of the driving arm 44 to be swung between a first position (FIG. 2) and a second position (FIG. 3).

The second shutter blade 58 has a first bore 581 and a second bore 582 fitted to the first driving pin 48 and the second driving pin 50 respectively. Between the first bore 581 and the second bore 582 is a concave portion 583 to receive the pivot portion 22 of the lower plate 20. The second shutter plate 58 is fixed to the driving arm 44 that the second shutter blade 58 is swung directly by the driving arm 44 between a first position (FIG. 2) and a second position (FIG. 3). When the first and the second shutter blades 56, 58 are swung to the first positions, the aperture 54 of the aperture plate 52 is exposed for exposure. When the first and the second shutter blades 56, 58 are swung to the second positions, the aperture 54 of the aperture plate 52 is shaded by the first and the second shutter blades 56, 58.

Please compare FIG. 1 to FIG. 4, a thickness of the shutter device of the present invention is thinner than the conventional shutter device. The conventional shutter device has the bottom end of the spindle 82 extruded out of the pivot portion 641 of the lower plate 64 to be the rotation center of the second shutter blade 70 that the working space 86 where the aperture plate 64 and the first and second shutter blade 68, 70 are received must be under the pivot portion 641 of the lower plate 64. The spindle 421 is not used to be the rotation center of the second shutter blade 58 in the present invention that the working space 26 is elevated to the same level as the pivot portion 22 of the lower plate 20 so that the thickness of the shutter device of the present invention is about equal to a distance between the upper plate 10 and the pivot portion 22 of the lower plate 20.

What is claimed is:

1. A shutter device of a camera, comprising:

an upper plate having a pivot portion;

a lower plate, which is connected to the upper plate, having a cavity portion on a bottom side thereof, and a pivot portion and an axle portion projected from a bottom of the cavity portion, wherein the cavity portion becomes a working space, and the pivot portion and the axle portion are received in the working portion;

an oscillator including a rotator having a spindle with opposite ends pivoted on the pivot portions of the upper plate and the lower plate respectively;

a driving arm, which is provided to the spindle of the rotator of the oscillator, having a first driving pin and a second driving pin extended into the working space;

an aperture plate, which has an aperture, received in the working space;

a first shutter blade, which is received in the working space, having a first bore fitted to the axle portion of the lower plate and a second bore fitted to the first driving pin of the driving arm; and a second shutter blade, which is received in the working space, having a first bore fitted to the first driving pin of the driving arm and a second bore fitted to the second driving pin of the driving arm;

wherein the first shutter blade and the second shutter blade are driven by the oscillator to be swung between a first position, in which the aperture of the aperture plate is exposed, and a second position, in which the aperture of the aperture plate is shaded.

2. The shutter device of a camera as defined in claim 1, wherein a thickness of the shutter device is about equal to a distance between a top side of the upper plate and a bottom side of the pivot portion of the lower plate.

3. The shutter device of a camera as defined in claim 1, wherein the second shutter blade has a concave portion between the first bore and the second bore to receive the pivot portion of the lower plate therein.

4. The shutter device of a camera as defined in claim 1, further comprising two hold plates, one of which is provided on a top side of the upper plate, and the other of which is provided on the bottom side of the lower plate, wherein the hold plate on the lower plate is located at the same level as a bottom side of the pivot portion of the lower plate.

* * * * *